(12) United States Patent
Trott et al.

(10) Patent No.: US 8,948,038 B1
(45) Date of Patent: Feb. 3, 2015

(54) AUGMENTING SPECTRUM SHARING USING NETWORK MEASUREMENTS

(71) Applicant: Google Inc., Mountain View, CA (US)

(72) Inventors: Mitch Trott, San Mateo, CA (US); Murari Srinivasan, Palo Alto, CA (US); Milo Steven Medin, Redwood City, CA (US)

(73) Assignee: Google Inc., Mountain View, CA (US)

( * ) Notice: Subject to any disclaimer, the term of this patent is extended or adjusted under 35 U.S.C. 154(b) by 119 days.

(21) Appl. No.: 13/709,139

(22) Filed: Dec. 10, 2012

(51) Int. Cl.
*H04L 12/26* (2006.01)
*H04W 4/00* (2009.01)
*H04W 24/10* (2009.01)

(52) U.S. Cl.
CPC .................................. *H04W 24/10* (2013.01)
USPC ........................................ 370/252; 370/328

(58) Field of Classification Search
CPC ...... H04W 24/00; H04W 52/46; H04L 43/50; H04L 43/0852; H04L 43/08; H04B 17/003; H04B 7/18543
USPC ......................................... 370/252, 310–350
See application file for complete search history.

(56) References Cited

U.S. PATENT DOCUMENTS

| | | | | |
|---|---|---|---|---|
| 7,451,202 B2 * | 11/2008 | Nakahara et al. | ............. | 709/223 |
| 7,620,396 B2 * | 11/2009 | Floam et al. | .................. | 455/434 |
| 7,881,726 B2 | 2/2011 | Gurney et al. | | |
| 7,907,904 B2 | 3/2011 | Waltho et al. | | |
| 8,004,995 B2 * | 8/2011 | Hyon et al. | .................... | 370/241 |
| 8,014,345 B2 | 9/2011 | Simms et al. | | |
| 8,041,380 B2 | 10/2011 | Hamdi et al. | | |
| 8,140,085 B2 | 3/2012 | Chaudhri et al. | | |
| 8,249,966 B2 | 8/2012 | Stanforth et al. | | |
| 8,478,854 B2 * | 7/2013 | Karunakaran et al. | ......... | 709/223 |
| 2002/0002052 A1 * | 1/2002 | McHenry | ....................... | 455/447 |
| 2006/0218392 A1 | 9/2006 | Johnston | | |
| 2007/0171887 A1 * | 7/2007 | Waxman | ........................ | 370/345 |
| 2007/0280170 A1 * | 12/2007 | Kawasaki | ...................... | 370/331 |
| 2008/0119130 A1 * | 5/2008 | Sinha | .................................. | 455/1 |
| 2008/0170539 A1 * | 7/2008 | Hyon et al. | .................... | 370/328 |
| 2009/0034508 A1 * | 2/2009 | Gurney et al. | ................. | 370/351 |
| 2009/0111388 A1 | 4/2009 | Chen | | |
| 2009/0111463 A1 * | 4/2009 | Simms et al. | ................. | 455/424 |
| 2009/0143019 A1 * | 6/2009 | Shellhammer | ............. | 455/67.11 |
| 2010/0027590 A1 * | 2/2010 | Alebachew et al. | .......... | 375/148 |
| 2010/0111027 A1 * | 5/2010 | Hart | ............................... | 370/329 |
| 2010/0195590 A1 * | 8/2010 | Park | ............................... | 370/329 |
| 2010/0197317 A1 | 8/2010 | Sadek et al. | | |
| 2010/0330919 A1 | 12/2010 | Gurney et al. | | |
| 2011/0021152 A1 | 1/2011 | Memik et al. | | |
| 2011/0028097 A1 | 2/2011 | Memik et al. | | |
| 2011/0028098 A1 | 2/2011 | Memik et al. | | |
| 2011/0028100 A1 | 2/2011 | Memik et al. | | |
| 2011/0028107 A1 | 2/2011 | Memik et al. | | |
| 2011/0070838 A1 | 3/2011 | Caulfield | | |
| 2011/0231941 A1 * | 9/2011 | Singer et al. | ..................... | 726/29 |
| 2012/0039284 A1 | 2/2012 | Barbieri et al. | | |
| 2012/0039367 A1 * | 2/2012 | Callaway, Jr. | ................. | 375/219 |
| 2012/0083303 A1 * | 4/2012 | Min et al. | ....................... | 455/502 |
| 2012/0210442 A1 * | 8/2012 | Ito | ................................... | 726/26 |
| 2012/0230263 A1 * | 9/2012 | Nam et al. | .................... | 370/329 |

* cited by examiner

Primary Examiner — Warner Wong
(74) Attorney, Agent, or Firm — Honigman Miller Schwartz and Cohn LLP

(57) ABSTRACT

A method of operating a spectrum system includes issuing commands to a transmitter in communication with the spectrum system, receiving network measurements from one or more wireless terminals, comparing, using a computing processor, the network measurements with the issued commands, and determining a compliance of the transmitter to the issued commands.

38 Claims, 6 Drawing Sheets

AUGMENTING SPECTRUM SHARING USING NETWORK MEASUREMENTS

TECHNICAL FIELD

This disclosure relates to augmenting spectrum sharing using network measurements.

BACKGROUND

Wireless communications continue to gain in popularity, but wireless communications are constrained due to a lack of available, interference free spectrum that may be used for reliable communications within a geographic area. A leading cause of the lack of available spectrum is the manner in which spectrum has been historically allocated. Since the early days of radio and telegraph transmission, the available radio spectrum in the United States and other jurisdictions has been carved up by regulatory agencies into discrete bands or channels. Use of spectrum bands has been restricted to certain types of users or certain licensees. Because many of these bands were allocated at a time when technology was very primitive and data rate requirements were very low, the bands were not allocated in an efficient manner for current demands.

The US President's Council of Advisors on Science and Technology (PCAST) has indicated that traditional practice of clearing federal spectrum by relocating federal users and subsequently auctioning the spectrum for commercial use is impractical and unsustainable. The costs and the timelines involved in relocating Federal users and equipment are daunting, and in some cases, simply impractical. At the same time, there are various Federal spectrum bands that are currently used in a sporadic and low duty-cycle manner, both geographically and in time. PCAST recognizes the need to implement a Spectrum Access System (SAS) that securely facilitates commercializing Federal spectrum without impeding Federal users, and also provide for temporary or permanent revocation of the commercial rights and pre-emption in favor of Federal Users.

SUMMARY

One aspect of the disclosure provides a method of operating a spectrum system. The method includes issuing commands to a transmitter in communication with the spectrum system, receiving network measurements from one or more wireless terminals, comparing, using a computing processor, the network measurements with the issued commands, and determining a compliance of the transmitter to the issued commands.

Implementations of the disclosure may include one or more of the following features. In some implementations, the method includes computing a correlation between the issued commands and corresponding changes in received network measurements over time. The method may include issuing a sequence of transmit power levels to the transmitter over a period of time. The network measurements may include received power levels by the one or more wireless terminals. The method may also include directing the one or more wireless terminals to report measurements of the transmitter each time a change in transmit power is executed by the transmitter. In some examples, the method includes computing a correlation between changes in transmit power levels of the transmitter and corresponding changes in the network measurements over time.

In some implementations, the method includes receiving terminal information from a spectrum operator system on a set of wireless terminals associated with the transmitter. The method may include communicating transmitter commands to a spectrum operator system, which is in communication with the transmitter. In some instances, the method includes instructing the spectrum operator system to identify a set of wireless terminals associated with the transmitter and instruct the set wireless terminals or a subset of the wireless terminals associated with the transmitter to return network measurements to the spectrum system. The spectrum operator system may, in accordance with the spectrum system, instruct different or random subsets of wireless terminals associated with the transmitter over time to return network measurements to the spectrum system. The method may include computing a correlation between the issued commands and corresponding changes in received network measurements over time.

The method may include receiving network measurements of the transmitter receiving the issued commands and of other transmitters detected by the one or more wireless terminals, and computing an interference cost between the transmitter receiving the issued commands and the other transmitters detected by the one or more wireless terminals.

The method may include initiating a remedial action when the transmitter is non-compliant with the issued commands. Moreover, initiating a remedial action may include revoking a license of the non-compliant transmitter.

Another aspect of the disclosure provides a spectrum system that includes a radio frequency propagation model stored in non-transitory memory and a compliance module executing on a computing processor. The compliance module issues commands to a transmitter in communication with the spectrum system, receives network measurements from one or more wireless terminals in communication with the spectrum system, compares the network measurements with the issued commands, and determines a compliance of the transmitter to the issued commands.

In some implementations, the compliance module computes a correlation between the issued commands and corresponding changes in received network measurements over time. The compliance module may issue a sequence of transmit power levels to the transmitter over a period of time. The network measurements may include received power levels by the one or more wireless terminals. The compliance module may also direct the one or more wireless terminals to report measurements of the transmitter each time a change in transmit power is executed by the transmitter. In some examples, the compliance module computes (using a computing processor) a correlation between changes in transmit power levels of the transmitter and corresponding changes in the network measurements over time.

In some implementations, the compliance module receives terminal information from a spectrum operator system on a set of wireless terminals associated with the transmitter. The compliance module may communicate transmitter commands to a spectrum operator system, which is in communication with the transmitter. In some instances, the compliance module instructs the spectrum operator system to identify a set of wireless terminals associated with the transmitter and instruct the set wireless terminals or a subset of the wireless terminals associated with the transmitter to return network measurements to the spectrum system. The spectrum operator system may, in accordance with the spectrum system, instruct different or random subsets of wireless terminals associated with the transmitter over time to return network measurements to the spectrum system. The compliance module may compute a correlation between the issued commands and corresponding changes in received network measurements over time.

The compliance module may receive network measurements of the transmitter receiving the issued commands and of other transmitters detected by the one or more wireless terminals, and compute an interference cost between the transmitter receiving the issued commands and the other transmitters detected by the one or more wireless terminals.

Another aspect of the disclosure provides a method of operating a spectrum system that includes instructing at least one wireless terminal to perform uplink signal power measurements, receiving uplink signal power measurements from the at least one wireless terminal, and determining a compliance to an interference requirement, using a computing processor, based on the received uplink signal power measurements. In some implementations, the method includes initiating a remedial action, such revocation of a transmitter license, after determining non-compliance with the interference requirement.

In some implementations, the method includes instructing a wireless terminal having an inactive data session to measure random access channel interference levels of a spectrum operator system. The method may include instructing a set of wireless terminals having an inactive data session to measure random access channel interference levels of the corresponding spectrum operator systems or random access channel components associated with those wireless terminals, and determining an aggregate uplink interference level.

The method may include instructing the at least one wireless terminal to take network measurements on a communication band at any time the at least one wireless terminal is not transmitting on that band or during uplink time slots. In some examples, the method includes instructing the at least one wireless terminal to take network measurements on a communication band in a geographical region where transmission is forbidden. The method may include instructing the at least one wireless terminal to take network measurements at certain time intervals and providing the at least one wireless terminal a time reference. The method may include acquiring the time reference from a transmitted pilot signal or an allowable wireless connection to a spectrum operator system in a different communication band.

In some implementations, the method includes instructing the at least one wireless terminal to take network measurements on a communication band upon realizing a trigger condition, such as a loss of communications with the spectrum system. The method may include instructing the at least one wireless terminal to store the network measurements in non-transitory memory during the loss of communications with the spectrum system and to communicate the stored network measurements to the spectrum system after regaining communications with the spectrum system.

In yet another aspect of the disclosure, a spectrum system includes a radio frequency propagation model stored in non-transitory memory and a compliance module executing on a computing processor. The compliance module instructs at least one wireless terminal to perform uplink signal power measurements, receives uplink signal power measurements from the at least one wireless terminal, and determines a compliance to an interference requirement, using a computing processor, based on the received uplink signal power measurements. The compliance module may initiate a remedial action when it determines non-compliance of the interference requirement.

In some implementations, the compliance module instructs a wireless terminal having an inactive data session to measure random access channel interference levels of a spectrum operator system. The compliance module may instruct a set of wireless terminals having an inactive data session to measure random access channel interference levels of the corresponding spectrum operator systems or random access channel components associated with those wireless terminals, and determines an aggregate uplink interference level.

The compliance module may instruct the at least one wireless terminal to take network measurements on a communication band at any time the at least one wireless terminal is not transmitting on that band or during uplink time slots. In some examples, the compliance module instructs the at least one wireless terminal to take network measurements on a communication band in a geographical region where transmission is forbidden. The compliance module may instruct the at least one wireless terminal to take network measurements at certain time intervals and providing the at least one wireless terminal a time reference. The compliance module may acquire the time reference from a transmitted pilot signal or an allowable wireless connection to a spectrum operator system in a different communication band.

In some implementations, the compliance module instructs the at least one wireless terminal to take network measurements on a communication band upon realizing a trigger condition, such as a loss of communications with the spectrum system. The compliance module may instruct the at least one wireless terminal to store the network measurements in non-transitory memory during the loss of communications with the spectrum system and to communicate the stored network measurements to the spectrum system after regaining communications with the spectrum system.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1A:
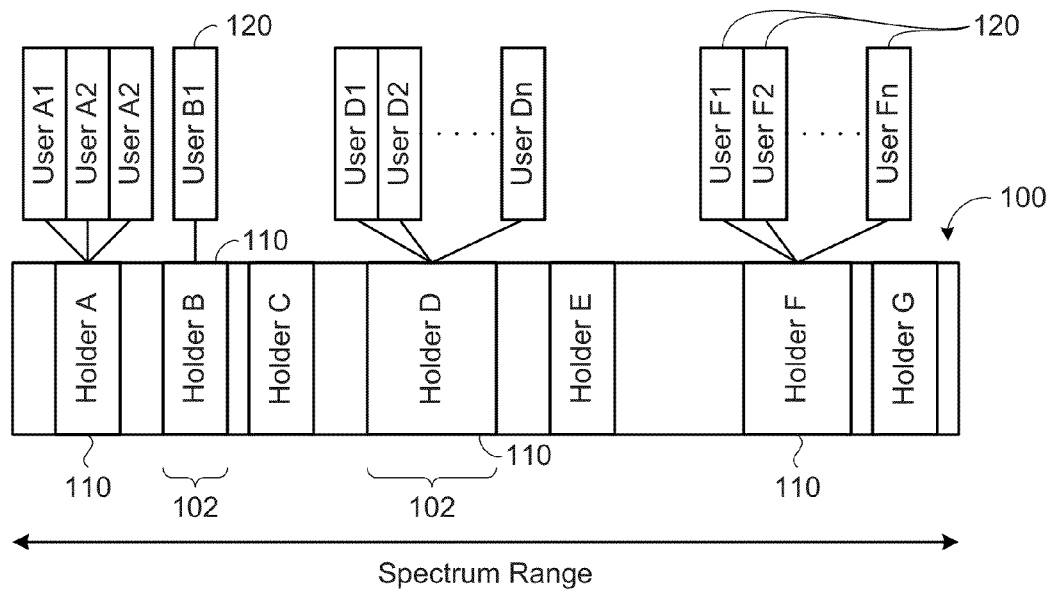
FIG. 1A is a schematic view of an exemplary spectrum.
Figure 1B:
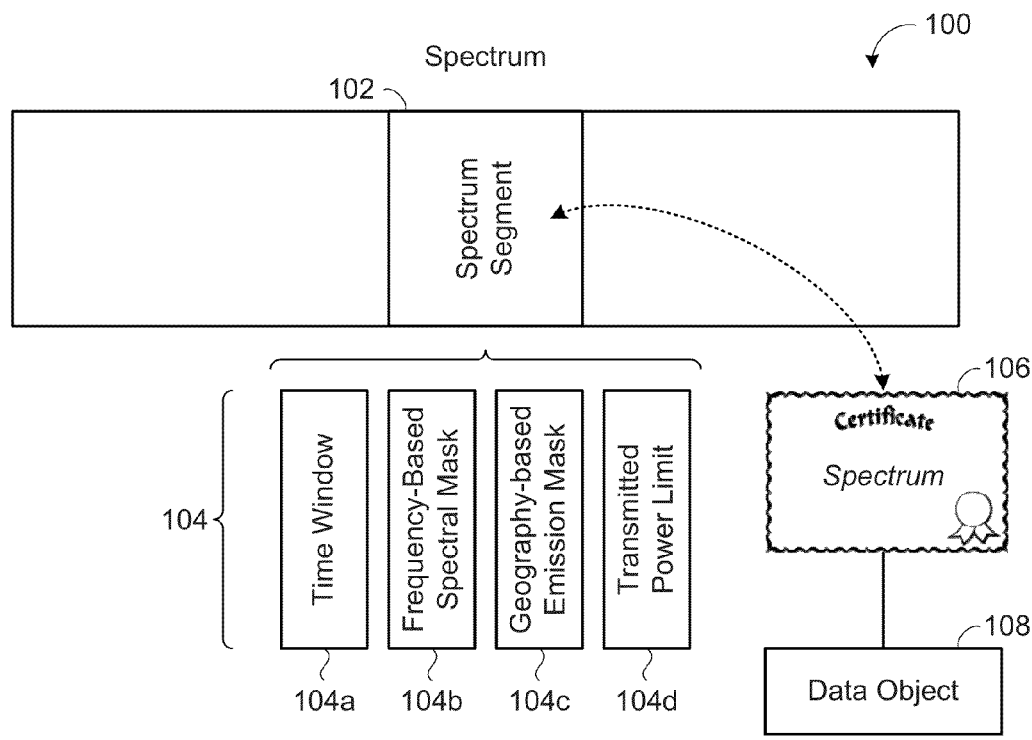
FIG. 1B is a schematic view of an exemplary spectrum and associated attributes.

Referring to FIGS. 1A and 1B, in some implementations, an electromagnetic spectrum 100 can be shared by multiple spectrum holders 110 for use in wireless communications. A spectrum holder 110 may be any entity having the authority to release spectrum use to another entity by granting the other entity access to the spectrum 100. The granting of access may be a lease or a sub-lease, as defined by the FCC, or a temporary permission to use spectrum associated with the holder. The spectrum holder 110 may be, but is not limited to, a government or regulatory agency (e.g., in the United States, the FCC), a Commission licensee (e.g., in the United States, an entity that has licensed spectrum directly from the FCC in the primary spectrum market), or a secondary market licensee. A spectrum user 120 (also referred to as an operator) may be any entity or wireless communications system that has a need for spectrum 100 in order to carry out wireless communications. The spectrum user 120 also may be a spectrum holder 110.

Each segment 102 of spectrum 100 for which access permission may be transferred may be identified by one or more attributes 104, each of which may be defined by one or more variables. Exemplary attributes 104 may include a time window 104a, a frequency-based spectral mask 104b, a geography-based emission mask 104c, and/or a transmitted power limit 104d. The time window 104a may be a period of time having starting and ending points (e.g., each given by a day and time). Alternatively, the time window 104a may be a period of time specified by a starting time and a duration of time (e.g., one second to several years).

The frequency-based spectral mask 104b may be a mathematically defined set of lines applied to levels of radio transmission. The frequency-based spectral mask 104b is generally intended to reduce interference by limiting excessive radiation at frequencies beyond a certain bandwidth. Spectral masks often include a center frequency and/or a frequency range. Also, spectral masks often include an absolute power component or a relative power component. For an absolute power component, the frequency-based spectral mask 104b may specify that transmission beyond a specified frequency range must be below a specified power value. For a relative power component, the frequency-based spectral mask may specify that transmission beyond a specified frequency range must be below a relative power value as determined by a function, such as a specified power value below the total amount of power being transmitted.

The geography-based emission mask 104c may include a defined geographical boundary that radios operating in accordance with the emission mask 104c may not appreciably transmit beyond. The geographical boundary specified by the geography-based emission mask 104c may be a complex construct that relates to a contiguous or non-contiguous area. The amount of permissible transmission beyond the geographical boundary may be determined in an absolute manner or a relative manner. For an absolute manner, the geography-based emission mask 104c may specify that transmission beyond the boundary must be below a specified power value. For a relative manner, the geography-based emission mask 104c may specify that transmission beyond the boundary must be below a relative power value as determined by a function, such as a specified power value below the total amount of power being transmitted. In some implementations, the function used for calculating the relative power value may include a distance parameter so that the relative power value may be calculated as a function of distance away from the boundary or other geographical reference.

The geography-based emission mask 104c, alone or in combination with the time window 104a, the frequency-based spectral mask 104b and the transmitted power limit 104d, may be established to control an amount of interference that a user system (also referred to as an operator system) generates with respect to continued operations of the spectrum holder 110 and/or other spectrum users 120. Control over user-generated interference may be balanced with the generation of interference that affects the spectrum user 120.

The transmitted power limit 104d may be a power value that radios operating in accordance with the transmitted power limit 104d may not exceed. The transmitted power limit 104d may be absolute or relative. The transmitted power limit 104d may be independent of the frequency-based spectral mask 104b and/or the geography-based emission mask 104c. The transmitted power limit 104d may be expressed as an average power value (e.g., average total power), a peak power value, or similar value. Exemplary transmitted power limits are 500 milliwatts (mW), one watt (W), 1,000 watts, etc.

Referring to FIG. 1B, spectrum users 120 may be interested in obtaining access to spectrum for a particular application, such as enterprise applications, two-way communications, point-to-point microwave transmissions, point-to-multipoint communications, cellular communications, mobile broadband communications, and so forth. Spectrum users 120 may gain spectrum access for their application(s) by obtaining a license or a secondary market license for spectrum 100 that supports the desired application. The spectrum 100 associated with the license may be defined by a geographical area, a spectral mask, a frequency (or set of frequencies) and one or more service rules. In the U.S., service rules are typically specified under an FCC "Part" number. The service rules under each license refer to an application and/or the type of radio technology that may use the licensed spectrum 100. While the service rules are typically commensurate with the user's desired application, the licensed spectrum effectively is limited for a stated purpose, although several types of uses may fall within the purpose as governed by the service rules associated with the license.

When granting spectrum access to a spectrum user 120, the spectrum user 120 may be issued a spectrum certificate 106. The spectrum certificate 106 may be a data object 108 on which the radio devices and/or other components of the user's system base their operation. Communications-related information, such as frequency, spectral mask and power limits, may be contained in the data object 108. In this manner, the communication equipment of the spectrum user 120 may be self-regulating to comply with the spectrum access grant and such operation is transparent to the spectrum user 120. For instance, if the frequency with which the equipment is to operate changes, the spectrum certificate 106 may be used to automatically effectuate the change.

Figure 2:
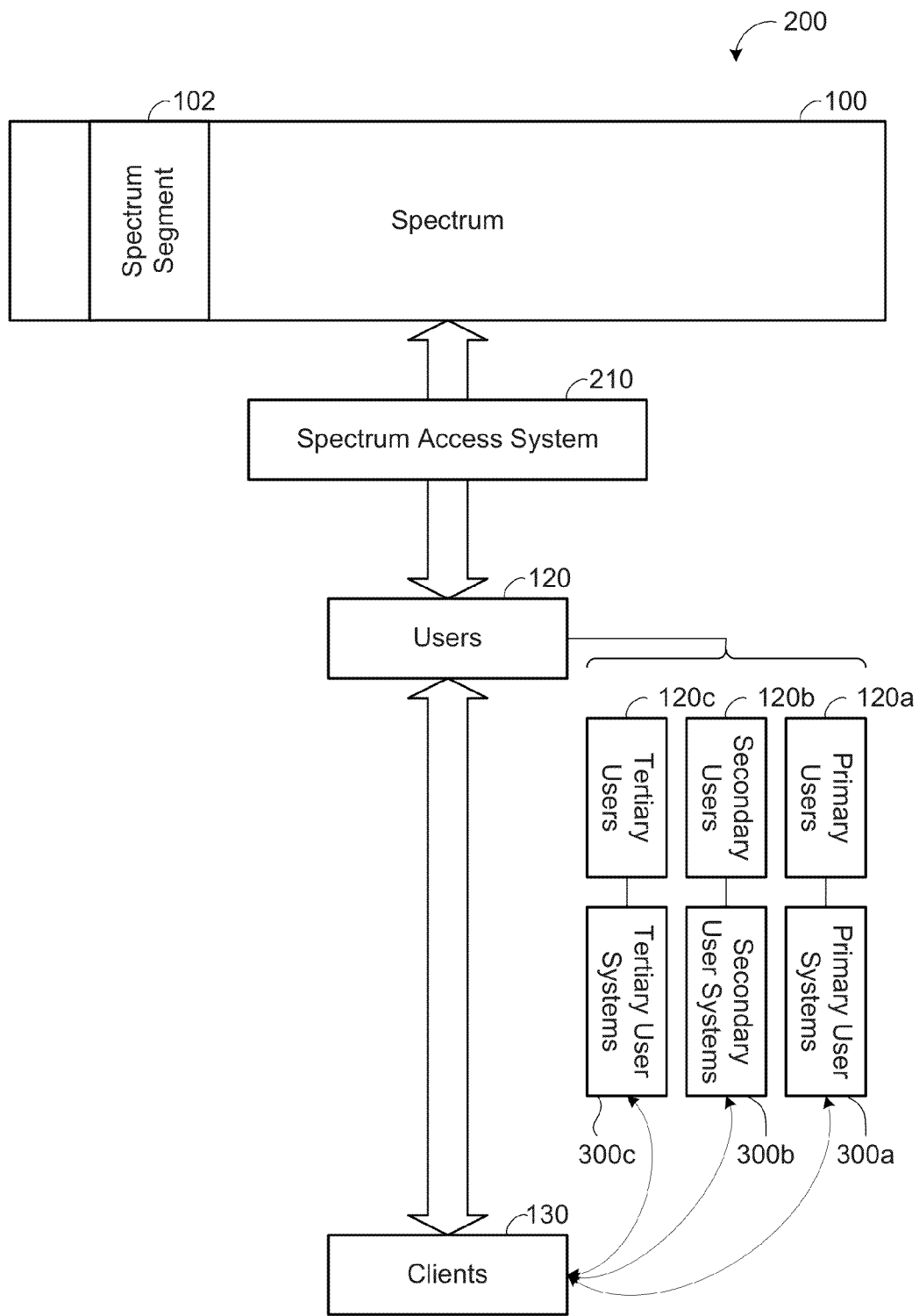
FIG. 2 is a schematic view of an exemplary spectrum sharing framework.

Referring to FIG. 2, in some implementations, a spectrum sharing framework 200 includes a spectrum access system (SAS) 210 that manages access to and operation of spectrum 100 by users 120. The spectrum access system 210 may execute on a computer 202 having a computing processor 204 in communication with non-transitory memory 206, which may store instructions for executing the spectrum access system 210. A spectrum holder 110 may use the spectrum access system 210 to implement interference protections, band-specific operating rules and enforcement mechanisms to ensure primary systems are protected from interference, award permissions to users 120 to transmit in the spectrum 100, and/or provide device authentication.

The spectrum access system 210 may have multiple categories of users 120. In some implementations, the users 120 are categorized as primary, secondary, tertiary, and so on. Primary users 120a may be federal users or devices that use federal spectrum 100, have the highest priority, and share spectrum 100 with lower priority users 120. Secondary users 120b may be federal or commercial users that have the next level of priority. For example, a secondary user 120b can be an infrastructure entity such as a base station. While the secondary users 120b may have to seek authorization from the spectrum access system 210 to transmit, any client 130 (e.g., phones, handheld devices, tablets, laptops, etc.) connecting to and controlled by the user 120 may not be required to obtain authorization to transmit directly by the spectrum access system 210. Tertiary users 120c may have the lowest level of priority and may operate in scenarios where they do not impede with the primary user 120a or secondary users 120b.

Figure 3:
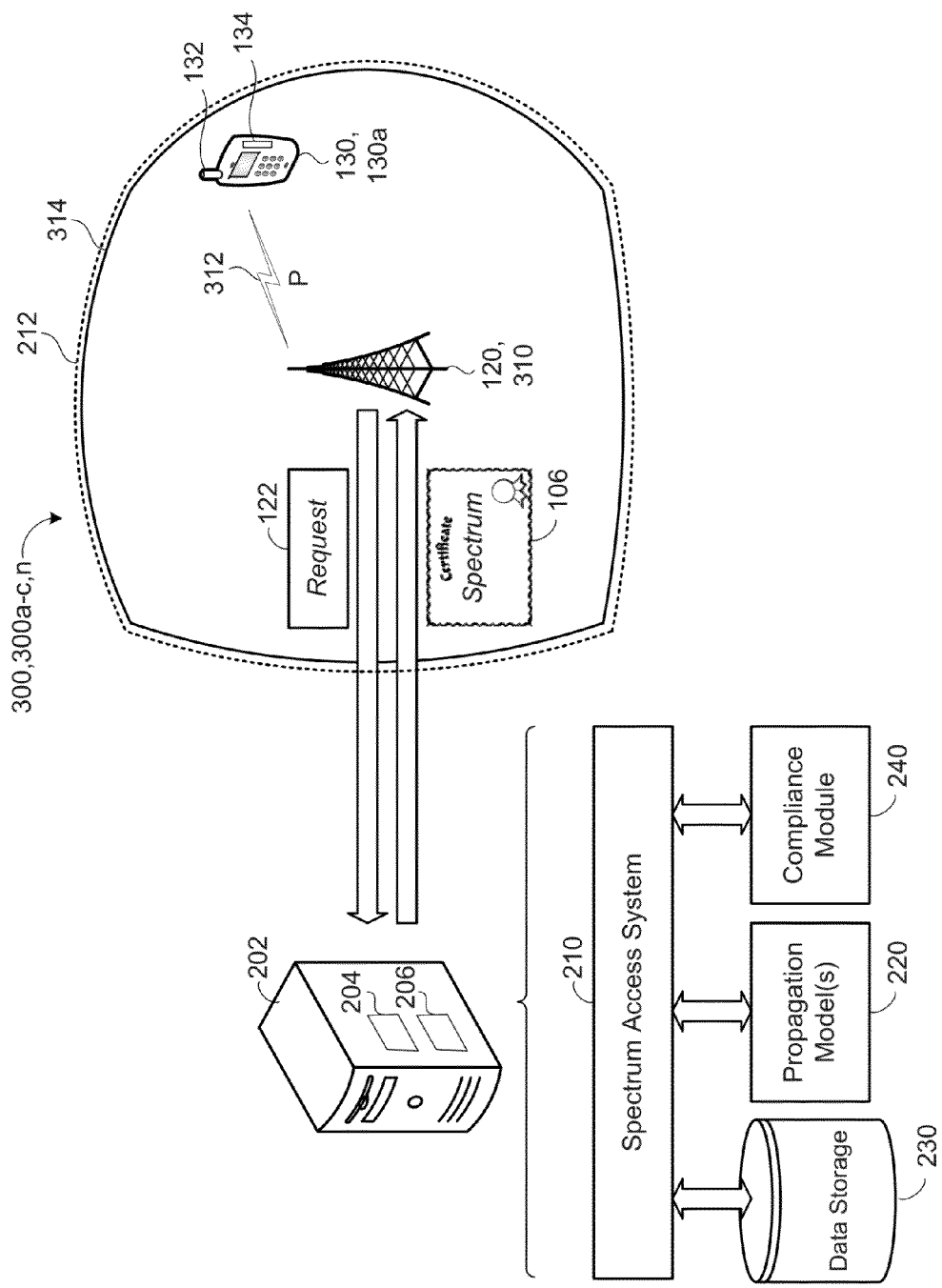
FIG. 3 is a schematic view of an exemplary spectrum operator system in communication with a spectrum access system.

Referring to FIG. 3, in some implementations, a spectrum operator system 300 of a user 120 includes one or more transmitters 310, such as base stations, emitting a signal 312 within a spectrum segment 102 associated with that user 120 (e.g., licensed to that user 120). The emitted signal 312 may have one or more associated attributes 104, such as a time window 104a, a frequency-based spectral mask 104b, a geography-based emission mask 104c, and/or a transmitted power limit 104d. For example, a geography-based emission mask 104c may be use to maintain the emitted signal 312 within a corresponding geographical boundary 312 of the transmitter 310. Each user 120, 120a-c may have a spectrum operator system 300, 300a-c.

In some implementations, the spectrum access system 210 retrieves (or receives) information on primary user requirements (e.g., on a periodic basis), accommodates asynchronous (inbound) requests for primary user pre-emption, and/or processes requests 122 by secondary users 120b to transmit. The requests 122 may supply all the necessary attributes required to reach a decision (e.g., device credentials, transmit power, location, antenna type, mounting height, etc.). Having authenticated the secondary user 120b, the spectrum access system 210 may make a determination on whether it is allowed to transmit, and if so, communicate this decision along with a time-bound (time-to-live or TTL) certificate 106. The spectrum access system 210 may record this new transmitter 120b, 310 in an internal database, along with its attributes.

The spectrum access system 210 may include a radio frequency (RF) propagation modeling mechanism 220 (also referred to as a propagation model) to estimate coverage areas 314 and protection contours 212, and data storage 230 (e.g., a database) for storing transmitter information and/or other information. Moreover, the spectrum access system 210 may access third-party terrain information for the purpose of refining the propagation model 220. In some implementations, the propagation model 220 is refined for local topography by leveraging network measurements from clients 130, such as network measurements from mobile devices that typically carry out and report back for handover purposes.

The spectrum access system 210 may compute a protection contour 212 around every registered transmitter 310, e.g., using the propagation model 220. The interior of the protection contour 212 for a given transmitter 310 is also its coverage area 314. The contour 212, and equivalently the coverage area 314, is a function of the attributes of the transmitter 310 as well as of all the transmitters 310 in the vicinity, the contour 212 may also take into account signal and interference strengths. The contour 212 may represent the union of points for which downlink signals from the transmitter 310, as estimated by the RF propagation model 220, are received with a signal-to-interference ratio (SINR) v that exceeds a minimum (e.g., $v > v_{min}$).

For an isolated transmitter 310 indexed by 'i', the SINR at a particular location z is calculated as:

$$v(z) = \frac{P_i(z)}{N_t}, \quad (1)$$

where $P_i(z)$ is the receive power and $N_t$ is the thermal noise power. The RF propagation model 220 may determine an estimated receive power $P_i(z)$ based on the attributes of the transmitter 310, such as a transmit power, an antenna height, type, orientation, etc. and a path between a location of the transmitter 310 and the receive point z.

A simplistic model may model the path loss based on the distance between the transmitter 310 and the receive point z and add some statistical variation in the form of shadowing. More sophisticated models may actually consider the path between the transmitter 310 and the receive point z and any terrain variation along that path in order to estimate the receive power $P_i(z)$ more accurately. For a transmitter indexed 'i' whose coverage area is subject to interference by other transmitters 310, the SINR may be given as:

$$v = \frac{P_i(z)}{\sum_{j \neq i} P_j(z) + N_t} \quad (2)$$

In the spectrum sharing framework, a user 120 with higher priority may, at any given point in time, preempt lower priority users 120 in a given area. For example, if a new primary user 120a wants to initiate operations in a given area, the spectrum access system 210 may receive coordinates and a required exclusion zone from the new primary user 120a and then determine all potential secondary and tertiary users 120b, 120c that are likely to interfere with the exclusion zone and revoke their transmission privileges. This revocation could be either transient or permanent.

In a spectrum sharing framework, the spectrum access system 210 permits secondary users 120b to transmit when they are unlikely to interfere with primary users 120a. In this context, the spectrum access system 210 assigns a transmit power to each secondary user 120b. However, the spectrum access system 210 may have no mechanism to validate compliance with a secondary license, which may dictate a certain transmit power or an attribute of a segment 102 of spectrum 100, such as a time window 104a, a frequency-based spectral mask 104b, a geography-based emission mask 104c, and/or a transmitted power limit 104d. In some implementations, the spectrum access system 210 uses of network measurements received from clients 130 (e.g., network measurements of mobile devices 130a) to enforce secondary licenses, improve RF propagation models 220, validate transmitter compliance, etc. A compliance module 240 of the spectrum access system 210 may execute on the computing processor 204 routines for enforcing compliance of commands issued by the spectrum access system 210 and/or licenses. If the compliance module 240 determines non-compliance of a secondary user 120b, the compliance module 240 may initiate a remedial action, e.g., send the secondary user 120b a warning or revoke the license of the non-compliant secondary user 120b.

Directing wireless devices 130a (also referred to as wireless terminals) to make network measurements (also referred to as network measurements for mobile wireless devices), specifically of the transmitters 310 whose compliance is being validated, can yield insights into whether a transmitter 310 is using a transmit power P prescribed by the spectrum access system 210. If there is a high confidence that a certain transmitter 310 is non-compliant, the spectrum access system 210 may revoke its license to transmit. Directing clients 130, such as wireless terminals 130a, to measure the interference generated by a secondary user system 300b eliminates placing this burden on the primary user 120a, which may not have been designed with secondary user systems 300b in mind. The spectrum access system 210 may use network measurements to refine its propagation model(s) 220, tune a network (e.g., spectrum operator system 300), and/or validate user license compliance. A network measurement may include a location of the wireless terminal 130a, a signal strength, a transmitter identifier, internal measurements, etc. Moreover, the wireless terminals 130a don't need to be connected to a network 300 while taking network measurements. The wireless terminals 130a may collect information over a period of time and/or while unconnected from a network 300 and then report the collected network measurements to the spectrum access systems 210 at a later time while connected to a network 300. For example, mobile wireless terminals 130a (e.g., cell phones) may collect network measurements while moving about and while connected or disconnected from transmitters 310.

Figure 4:
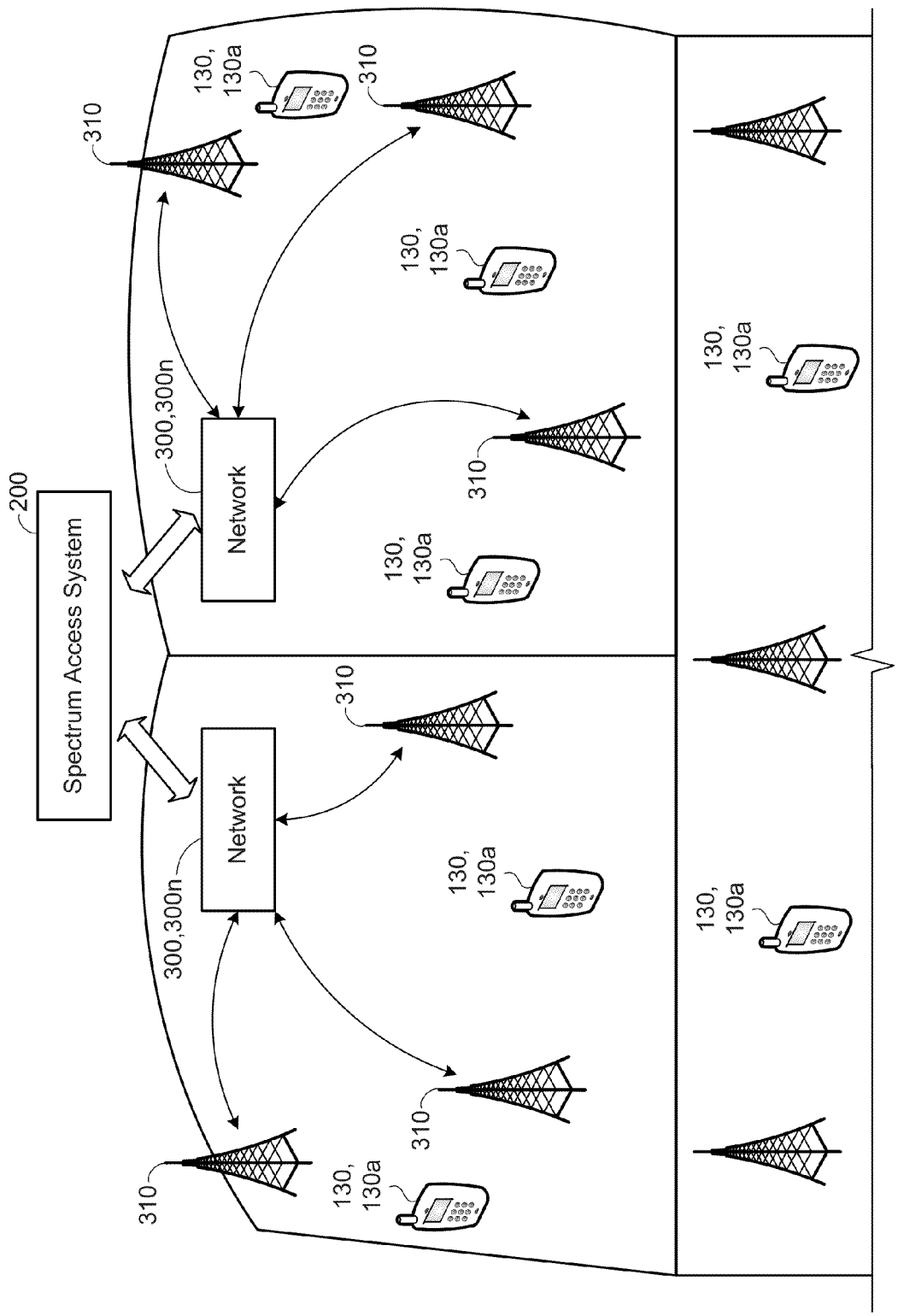
FIG. 4 is a schematic view of exemplary spectrum operator systems in communication with a spectrum access system.

Referring to FIGS. 3 and 4, in some implementations, a wireless terminal 130a may be directed to report measurements of a specific base station 310 to the spectrum access system 210. The spectrum access system 210 may issue a sequence of transmit power levels to the base station 310 over a period of time (e.g., commands to increase the transmit power P by 1 dB/min). At each of the times when a change in transmit power is executed by the base station 310, one or more wireless terminals 130a may be directed to report measurements of that base station 310 back to the spectrum access system 210. This may be directly or indirectly orchestrated by the spectrum access system 210.

The spectrum access system 210 may inform a spectrum operator system 300, such as a mobile radio access network (RAN) 300n (e.g., MME in a 4G LTE network, RNC in a 3G UMTS network), about the need for making measurements of one or more of its base stations 310. An RAN 300n provides connection between user equipment, such as a mobile phone, a computer, or any remotely controlled machine, and its core network. A silicon chip residing in both the core network and the user equipment typically provides the RAN functionality. Entities, such as users 120 or clients 130 (e.g., wireless terminals 130a), within the RAN 300n are typically aware of the state of connected wireless terminals 130a, specifically which wireless terminals 130a may be associated with the base station 310, or neighboring base stations 310. The RAN 300n may communicate terminal information (e.g., mobile device identification, location, etc.) to the spectrum access system 210 for wireless terminals 130a associated with a particular base station 310. The RAN 300n may instruct a subset of these wireless terminals 130a (e.g., at the direction of the spectrum access system 210) to conduct measurements of the base station 310 and return these measurements back to the spectrum access system 210.

Over time, different subsets of wireless terminals 130a may be employed to conduct measurements of the base station(s) 310. The spectrum access system 210 can then compute a correlation between the power changes that it directed and the corresponding changes in measurements of received power levels from a population of wireless terminals 130a. Alternatively, measurements from the same set of wireless terminals 130a before and after the requested change can be compared to ensure compliance.

In some implementations, a random group of wireless terminals 130a may be instructed to conduct measurements across the radio access network 300n, which are then relayed to the spectrum access system 210, along with association points of these wireless terminals 130a. The locations of these base stations 310 with which the wireless terminals 130a are associated can be used to produce approximate locations for the wireless terminals 130a themselves. In turn, the spectrum access system 210 can infer the interference cost of other base stations 310 detected and measured by the wireless terminals 130a and reported back to the spectrum access system 210. Since the spectrum access system 210 may know the actual transmit power P of every base station 310, any potentially non-compliant base stations 310 can be identified and short-listed for more careful validation. Moreover, this analysis may result in a refinement of the RF propagation model(s) 220, or a determination of non-compliance.

Measurement of uplink interference by base stations 310 tends to be difficult. A base station 310 may need to leave some air-link resources vacant and unscheduled to its own wireless terminals 130a in order to measure interference from wireless terminals 130a associated with neighboring base stations 310. In the context of shared spectrum 100, primary user systems 300a may utilize a completely different technology from a secondary user system 300b, and therefore may only be able to measure aggregate wideband noise rise.

A variety of mechanisms can be used to determine the extent to which transmissions from wireless terminals 130a (i.e., uplink transmission) interfere with other systems, such as a protected primary system, using the same spectrum. One approach is to infer the interference algorithmically, for example, by using the locations and transmit powers of the wireless terminals 130a. The algorithmic approach, while useful, can be quite inaccurate. Another approach is to have the equipment in the primary system carry out power measurements. This unduly burdens the equipment in the primary system, operating on one radio standard, with the need to measure signals from another radio standard. Such measurements are often not possible without prohibitively expensive changes to legacy equipment. Yet another approach is to deploy either fixed or mobile (e.g., on measurement vans) measurement equipment to measure power levels at various locations. This approach requires costly installation and operation of measurement equipment and even then may not provide measurements at sufficiently many locations or times of day. Yet another approach is to allow the wireless terminals 130a to carry out these measurements themselves.

While wireless terminals 130a for cellular systems (e.g., a type of spectrum operator system 300) are typically not designed to measure signals from other wireless terminals 130a, in many cases their hardware and software can be adapted to do so without undue cost. This is particularly true in time-division duplex (TDD) wireless systems, in which transmission and reception occur on the same frequency band. In this case, the radio and baseband hardware is already equipped with many of the capabilities needed for measurement. For systems such as TDD LTE, which have a flexible time slot structure in which time slots may be used for transmission or reception depending on configuration messages, the modifications required may be small.

A wireless terminal 130a can potentially take measurements on a band at any time it is not transmitting on that band. In a slotted TDD system, uplink measurements may be taken on a band during uplink (transmit) time slots in which the terminal does not itself transmit on that band. Due to practical limits on RF design, in many cases the hardware in the wireless terminal 130a will be able to take useful measurements only when the wireless terminal 130a has no transmissions on any band, not just the band being measured.

In a spectrum access system 210 there may be geographic regions in which transmission on a particular band is permitted, and these regions may abut regions in which transmission in that band is forbidden, for example to protect an incumbent primary user 120a. It is particularly advantageous for a mobile wireless terminal 130a to take uplink measurements on a band in regions where transmission is forbidden, to assess whether undesired interference is impinging on this area. To make these measurements, the receiver 132 in the wireless terminal 130a may be configured to be active even though the transmit section is disabled. Further, to be best able to take measurements at precise timing instants, the wireless terminal 130a may require an accurate time reference. In some locations, the timing reference may be extracted from transmissions of pilot signals. In a forbidden area, however, the pilot signals may be too weak to detect, in which case the timing reference may be extracted from some other wireless connection that is not forbidden, such as a cellular system operating in a different band.

A wireless terminal 130a taking uplink measurements needs information about which bands to measure at what times. If the wireless terminal 130a has a communication path that allows it to receive real-time messages, the measurements can be carried out on demand in response to commands from the infrastructure. If, however, the wireless terminal 130a lacks such a communication path, or if it is desirable to use that path only infrequently, one option is to preload instructions on the wireless terminal 130a that cause it to take measurements under certain trigger conditions, for example, when the device is at or near a location or region and store the network measurements in non-transitory memory 134 of the wireless terminal 130a. These measurements can be delivered to the spectrum system 210 at a later time, for example after the wireless terminal 130a regains communication.

The wireless terminal 130a can measure aggregate levels of uplink power or specific components of the uplink signal. For example, most modern communication systems earmark airlink resources for initial access transmissions by wireless terminals 130a. Typically, these resources are referred to as the "RACH" (random access channel) channel, and may have a well-known but cell-specific physical structure in the time-frequency space. They carry the advantage of being a non-coded waveform, and thus decodable by any entity that is aware of their structure.

If wireless terminals 130a are made aware of these resources and the special RACH signaling waveforms employed in those cells, they can measure RACH signal power levels and report these back to the radio access network 300n, which further reports it back to the spectrum access system 210. The spectrum access system 210 may then infer the aggregate uplink interference based on the RACH signal power levels. An advantage of the RACH measurements is that they are distinguished from the signals emitted by, e.g., a primary user of a band, which allows them to be identified as interference to the primary user 120a. In contrast, a simple aggregate power level measurement by the wireless terminal 130a runs the risk of blending the power emitted by the primary system with power emitted by the mobile terminals, while only the latter acts as interference to the primary system.

The wireless terminals 130a may even report RACH measurements on certain time instants and specific RACH resources, which can enable the radio access network 300n and the SAS 210 to localize the source of the uplink interference to specific cells. This is because cells are aware of when and with what waveform mobiles used a RACH signal to obtain access into the system, which is information that can be supplied back to the SAS 210 for correlation with the uplink measurements made by wireless terminals 130a.

In this context, wireless terminals 130a in an idle mode (i.e., not involved in an active voice or data session) may be utilized to assist in determination of uplink interference from their user system 300. Consider an idle (secondary) wireless terminal 130a that is likely to be in the vicinity of a protected (primary) zone 212. The wireless terminal 130a may listen on a frequency that it normally transmits on, while idle. If idle wireless terminals 130a are made aware of the special RACH signaling waveforms employed in a user system associated with the idle wireless terminals 130a, the idle wireless terminals 130a can measure and report back RACH interference levels. The wireless terminals 130a may report the measured interference levels to the radio access network 300n, which further reports it back to the spectrum access system 210.

The wireless terminals 130a may report RACH measurements on certain time instants and specific RACH resources, which can enable the radio access network 300n and the spectrum access system 210 to localize the source of the uplink interference to specific base stations 310. The base stations may be aware of when and with what waveform wireless terminals 130a used a RACH signal to obtain access into the spectrum access system 210, which is information that can be supplied back to the spectrum access system 210 for correlation with the measurements made by idle wireless terminals 130a.

Measurement of an uplink signal power at a particular location can be used to draw conclusions about power levels at other locations. Consider a location L and a geographic area A that contains L. Assume further that transmissions on frequency band B are forbidden throughout area A. The SAS 210 can perform a calculation, based on propagation models 220 and permitted power levels, to determine the maximum signal level P that can be delivered to location L by compliant wireless terminals located outside area A. If RACH signal power level P1>P is detected in band B at location L, the SAS 210 can conclude that a wireless terminal 130a is in some way out of compliance, for example by exceeding its allowed transmit power, by using an excessively high antenna, or by transmitting at a forbidden location. The compliance module 240 may initiate a remedial action, such as revocation of a transmitter license, when it determines non-compliance of an interference requirement.

Figure 5:
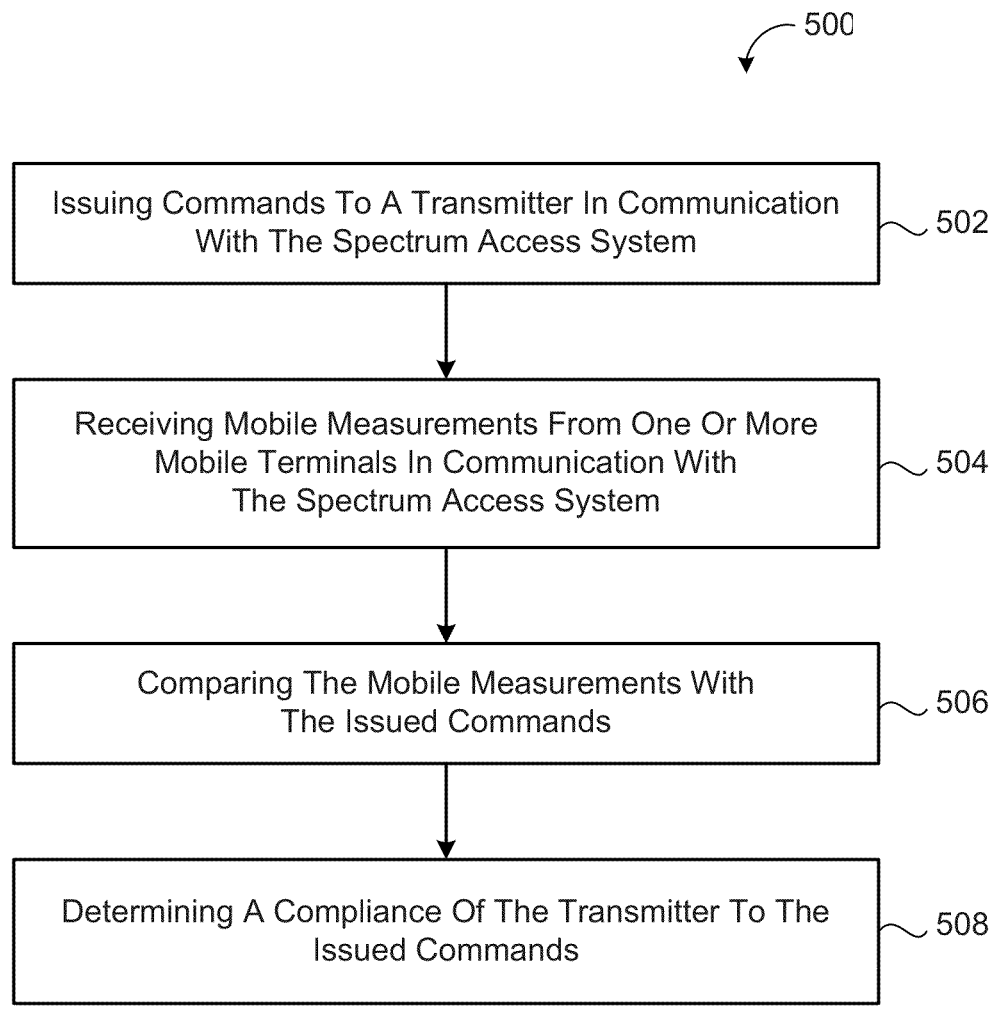
FIG. 5 is an exemplary arrangement of operations for a method of operating a spectrum access system.

FIG. 5 provides an exemplary arrangement 500 of operations for a method of operating a spectrum access system 210. The method includes issuing 502 commands to a transmitter 310 in communication with the spectrum access system 210, receiving 504 network measurements from one or more wireless terminals 130a in communication with the spectrum access system 210, comparing 506, using a computing processor 204, the network measurements with the issued commands, and determining 508 a compliance of the transmitter 310 to the issued commands. The method may include initiating a remedial action, such as revocation of a license or issuance of a warning, when the transmitter is non-compliant with the issued commands.

In some implementations, the method includes computing a correlation between the issued commands and corresponding changes in received network measurements over time. The method may include issuing a sequence of transmit power levels to the transmitter 310 over a period of time. The network measurements may include received power levels by the one or more wireless terminals 130a. The method may also include directing the one or more wireless terminals 130a to report measurements of the transmitter 310 each time a change in transmit power P is executed by the transmitter 310. In some examples, the method includes computing a correlation between changes in transmit power levels of the transmitter 310 and corresponding changes in the network measurements over time.

In some implementations, the method includes receiving terminal information from a spectrum operator system 300 on a set of wireless terminals 130a associated with the transmitter 310. The method may include communicating transmitter commands to a spectrum operator system 300, which is in communication with the transmitter 310. In some instances, the method includes instructing the spectrum operator system 300 to identify a set of wireless terminals 130a associated with the transmitter 310 and instruct the set of wireless terminals 130a or a subset of the wireless terminals 130a associated with the transmitter 310 to return network measurements to the spectrum access system 210. The spectrum operator system 300 may, in accordance with the spectrum access system 210, instruct different or random subsets of wireless terminals 130a associated with the transmitter 310 over time to return network measurements to the spectrum access system 210. The method may include computing a correlation between the issued commands and corresponding changes in received network measurements over time.

The method may include receiving network measurements of the transmitter 310 receiving the issued commands and of other transmitters 310 detected by the one or more wireless terminals 130a, and computing an interference cost between the transmitter 310 receiving the issued commands and the other transmitters 310 detected by the one or more wireless terminals 130a. In some examples, the method includes determining an uplink interference for a user system 300 of the transmitter 310 based on the network measurements, which may include measured interference levels. Moreover, the method may include instructing an idle wireless terminal 130a to measure random access channel (RACH) interference levels of a spectrum operator system 300 associated with the idle wireless terminal 130a. In some examples, the method includes instructing a set of idle wireless terminals 130a to measure RACH interference levels of the corresponding spectrum operator systems 300 or RACH components associated with the idle wireless terminals 130a, and determining an aggregate uplink interference level.

Figure 6:
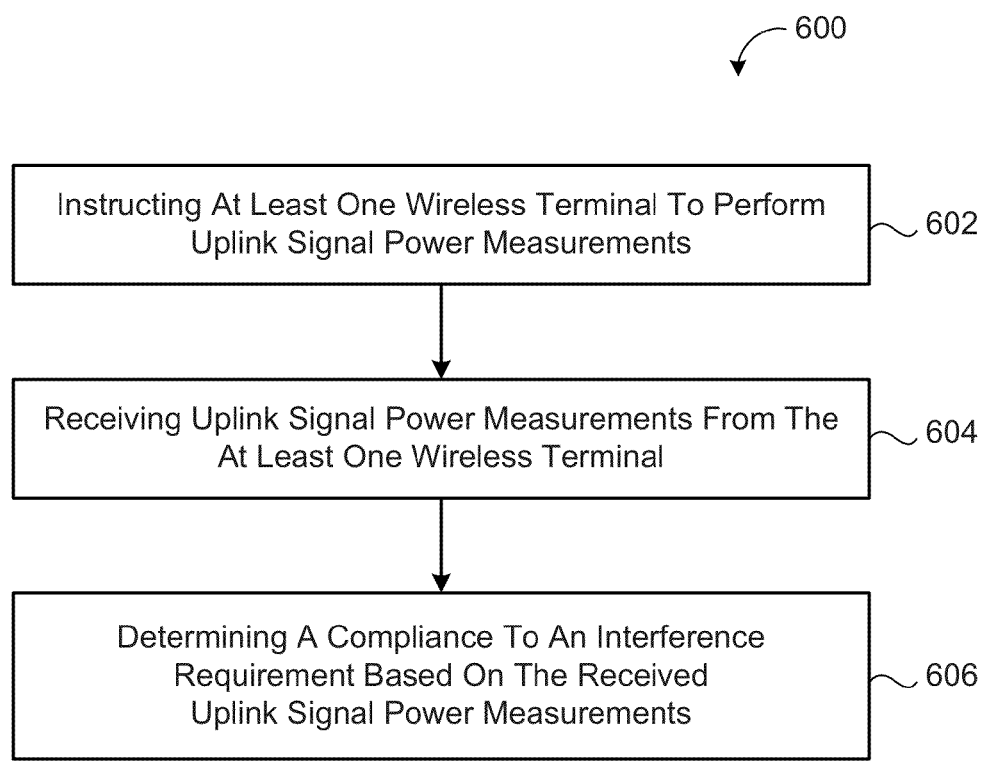
FIG. 6 is an exemplary arrangement of operations for a method of operating a spectrum access system.

FIG. 6 provides an exemplary arrangement 600 of operations for a method of operating a spectrum access system 210. The method includes instructing 602 at least one wireless terminal 130a to perform uplink signal power measurements, receiving 604 uplink signal power measurements from the at least one wireless terminal 130a, and determining 606 a compliance to an interference requirement, using a computing processor 204, based on the received uplink signal power measurements. The method may include initiating a remedial action, such as revocation of a license or issuance of a warning, when there is non-compliance with the interference requirement.

In some implementations, the method includes instructing a wireless terminal 130a having an inactive data session to measure random access channel interference levels of a spectrum operator system 300. The method may include instructing a set of wireless terminals 130a having an inactive data session to measure random access channel interference levels of the corresponding spectrum operator systems 300n or random access channel components 310 associated with those wireless terminals 130a, and determining an aggregate uplink interference level.

The method may include instructing the at least one wireless terminal 130a to take network measurements on a communication band at any time the at least one wireless terminal 130a is not transmitting on that band or during uplink time slots. In some examples, the method includes instructing the at least one wireless terminal 130a to take network measurements on a communication band in a geographical region where transmission is forbidden. The method may include instructing the at least one wireless terminal 130a to take network measurements at certain time intervals and providing the at least one wireless terminal 130a a time reference. The method may include acquiring the time reference from a transmitted pilot signal or an allowable wireless connection to a spectrum operator system 300 in a different communication band.

In some implementations, the method includes instructing the at least one wireless terminal 130a to take network measurements on a communication band upon realizing a trigger condition, such as a loss of communications with the spectrum system 210. The method may include instructing the at least one wireless terminal 130a to store the network measurements in non-transitory memory 134 during the loss of communications with the spectrum system 210 and to communicate the stored network measurements to the spectrum system 210 after regaining communications with the spectrum system 210.

Various implementations of the systems and techniques described here can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The terms "data processing apparatus", "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as an application, program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

One or more aspects of the disclosure can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed is:

1. A method of operating a spectrum system, the method comprising:
issuing commands to a transmitter in communication with the spectrum system;
receiving network measurements from one or more wireless terminals;
comparing, using a computing processor, the network measurements with the issued commands;
determining a compliance of the transmitter to the issued commands;
communicating transmitter commands to a spectrum operator system, the spectrum operator system in communication with the transmitter; and
instructing the spectrum operator system to:
identify a set of wireless terminals associated with the transmitter;
instruct the set of wireless terminals or a subset of the wireless terminals associated with the transmitter to return network measurements to the spectrum system; and
instruct different subsets of wireless terminals associated with the transmitter over time to return network measurements to the spectrum system.

2. The method of claim 1, further comprising computing a correlation between the issued commands and corresponding changes in received network measurements over time.

3. The method of claim 1, wherein issuing commands to the transmitter comprises issuing a sequence of transmit power levels to the transmitter over a period of time, the network measurements comprising received power levels by the one or more wireless terminals.

4. The method of claim 3, further comprising directing the one or more wireless terminals to report measurements of the transmitter each time a change in transmit power is executed by the transmitter.

5. The method of claim 4, further comprising computing a correlation between changes in transmit power levels of the transmitter and corresponding changes in the network measurements over time.

6. The method of claim 1, further comprising receiving terminal information from a spectrum operator system on a set of wireless terminals associated with the transmitter.

7. The method of claim 1, further comprising instructing the spectrum operator system to instruct random subsets of wireless terminals associated with the transmitter over time to return network measurements to the spectrum system.

8. The method of claim 1, further comprising computing a correlation between the issued commands and corresponding changes in received network measurements over time.

9. The method of claim 1, further comprising:
receiving network measurements of the transmitter receiving the issued commands and of other transmitters detected by the one or more wireless terminals; and
computing an interference cost between the transmitter receiving the issued commands and the other transmitters detected by the one or more wireless terminals.

10. A method of operating a spectrum system, the method comprising:
issuing commands to a transmitter in communication with the spectrum system;
receiving network measurements from one or more wireless terminals;
comparing, using a computing processor, the network measurements with the issued commands;
determining a compliance of the transmitter to the issued commands; and
initiating a remedial action when the transmitter is non-compliant with the issued commands;
wherein initiating a remedial action comprises revoking a license of the non-compliant transmitter.

11. A spectrum system comprising:
a radio frequency propagation model stored in non-transitory memory; and
a compliance module executing on a computing processor, the compliance module:
issuing commands to a transmitter in communication with the spectrum system;
receiving network measurements from one or more wireless terminals;
comparing the network measurements with the issued commands;
determining a compliance of the transmitter to the issued commands;
communicating transmitter commands to a spectrum operator system, the spectrum operator system in communication with the transmitter; and
instructing the spectrum operator system to:
identify a set of wireless terminals associated with the transmitter;
instruct the set wireless terminals or a subset of the wireless terminals associated with the transmitter to return network measurements to the spectrum system; and
instruct different subsets of wireless terminals associated with the transmitter over time to return network measurements to the spectrum system.

12. The spectrum system of claim 11, wherein the compliance module computes a correlation between the issued commands and corresponding changes in received network measurements over time.

13. The spectrum system of claim 11, wherein issuing commands to the transmitter comprises issuing a sequence of transmit power levels to the transmitter over a period of time, the network measurements comprising received power levels by the one or more wireless terminals.

14. The spectrum system of claim 13, wherein the compliance module directs the one or more wireless terminals to report measurements of the transmitter each time a change in transmit power is executed by the transmitter.

15. The spectrum system of claim 14, wherein the compliance module computes a correlation between changes in transmit power levels of the transmitter and corresponding changes in the network measurements over time.

16. The spectrum system of claim 11, wherein the compliance module receives terminal information from a spectrum operator system on a set of wireless terminals associated with the transmitter.

17. The spectrum system of claim 11, wherein the compliance module instructs the spectrum operator system to instruct random subsets of wireless terminals associated with the transmitter over time to return network measurements to the spectrum system.

18. The spectrum system of claim 11, wherein the compliance module computes a correlation between the issued commands and corresponding changes in received network measurements over time.

19. The spectrum system of claim 11, wherein the compliance module:
receives network measurements of the transmitter receiving the issued commands and of other transmitters detected by the one or more wireless terminals; and computes an interference cost between the transmitter receiving the issued commands and the other transmitters detected by the one or more wireless terminals.

20. The spectrum system of claim 11, wherein the compliance module initiates a remedial action when the transmitter is non-compliant with the issued commands.

21. A spectrum system comprising:
a radio frequency propagation model stored in non-transitory memory; and
a compliance module executing on a computing processor, the compliance module:
issuing commands to a transmitter in communication with the spectrum system;
receiving network measurements from one or more wireless terminals;
comparing the network measurements with the issued commands; and
determining a compliance of the transmitter to the issued commands;
wherein the compliance module revokes a license of the non-compliant transmitter.

22. A method of operating a spectrum system, the method comprising:
instructing at least one wireless terminal to perform uplink signal power measurements;
receiving uplink signal power measurements from the at least one wireless terminal;
determining a compliance to an interference requirement, using a computing processor, based on the received uplink signal power measurements;
instructing a set of wireless terminals having an inactive data session to measure random access channel interference levels of the corresponding spectrum operator systems or random access channel components associated with those wireless terminals; and
determining an aggregate uplink interference level.

23. The method of claim 22, further comprising instructing the at least one wireless terminal to take network measurements on a communication band at any time the at least one wireless terminal is not transmitting on that band.

24. The method of claim 23, further comprising instructing the at least one wireless terminal to take network measurements on a communication band during uplink time slots.

25. A method of operating a spectrum system, the method comprising:
instructing at least one wireless terminal to perform uplink signal power measurements;
instructing the at least one wireless terminal to take network measurements on a communication band in a geographical region where transmission is forbidden;
instructing the at least one wireless terminal to take network measurements at certain time intervals;
acquiring a time reference from a transmitted pilot signal or an allowable wireless connection to a spectrum operator system in a different communication band;
providing the at least one wireless terminal the time reference;
receiving uplink signal power measurements from the at least one wireless terminal; and
determining a compliance to an interference requirement, using a computing processor, based on the received uplink signal power measurements.

26. The method of claim 22, further comprising instructing the at least one wireless terminal to take network measurements on a communication band upon realizing a trigger condition.

27. The method of claim 26, wherein the trigger condition comprises loss of communications with the spectrum system.

28. The method of claim 27, further comprising instructing the at least one wireless terminal to:
store the network measurements in non-transitory memory during loss of communications with the spectrum system; and
communicate the stored network measurements to the spectrum system after regaining communications with the spectrum system.

29. The method of claim 22, further comprising initiating a remedial action after determining non-compliance with the interference requirement.

30. A spectrum system comprising:
a radio frequency propagation model stored in non-transitory memory; and
a compliance module executing on a computing processor, the compliance module:
instructing at least one wireless terminal to perform uplink signal power measurements;
receiving uplink signal power measurements from the at least one wireless terminal;
determining a compliance to an interference requirement, using a computing processor, based on the received uplink signal power measurements;
instructing a set of wireless terminals having an inactive data session to measure random access channel interference levels of the corresponding spectrum operator systems or random access channel components associated with those wireless terminals; and
determining an aggregate uplink interference level.

31. The spectrum system of claim 30, wherein the compliance module instructs the at least one wireless terminal to take network measurements on a communication band at any time the at least one wireless terminal is not transmitting on that band.

32. The spectrum system of claim 31, wherein the compliance module instructs the at least one wireless terminal to take network measurements on a communication band during uplink time slots.

33. The spectrum system of claim 30, wherein the compliance module initiates a remedial action after determining non-compliant with the interference requirement.

34. A spectrum system comprising:
a radio frequency propagation model stored in non-transitory memory; and
a compliance module executing on a computing processor, the compliance module:
instructing at least one wireless terminal to perform uplink signal power measurements;
instructing the at least one wireless terminal to take network measurements on a communication band in a geographical region where transmission is forbidden;
instructing the at least one wireless terminal to take network measurements at certain time intervals;
acquiring a time reference from a transmitted pilot signal or an allowable wireless connection to a spectrum operator system in a different communication band;
providing the at least one wireless terminal the time reference;
receiving uplink signal power measurements from the at least one wireless terminal; and
determining a compliance to an interference requirement, using a computing processor, based on the received uplink signal power measurements.

35. The spectrum system of claim 30, wherein the compliance module instructs the at least one wireless terminal to take network measurements on a communication band upon realizing a trigger condition.

36. The spectrum system of claim 35, wherein the trigger condition comprises loss of communications with the spectrum system.

37. The spectrum system of claim 36, wherein the compliance module instructs the at least one wireless terminal to:
   store the network measurements in non-transitory memory during loss of communications with the spectrum system; and
   communicate the stored network measurements to the spectrum system after regaining communications with the spectrum system.

38. The spectrum system of claim 30, wherein the compliance module initiates a remedial action after determining non-compliance with the interference requirement.

* * * * *